United States Patent
Chung et al.

(10) Patent No.: US 9,999,321 B2
(45) Date of Patent: Jun. 19, 2018

(54) DICER

(71) Applicant: Huiyang Allan Plastic & Electric Industries Co., Limited, Huizhou (CN)

(72) Inventors: Chi Yin Chung, Huizhou (CN); Kwok Wing Ng, Huizhou (CN); Jin Xiang Deng, Huizhou (CN)

(73) Assignee: Huiyang Allan Plastic & Elecric Industries Co., Ltd., Huizhou (CN)

( * ) Notice: Subject to any disclaimer, the term of this patent is extended or adjusted under 35 U.S.C. 154(b) by 326 days.

(21) Appl. No.: 14/928,545

(22) Filed: Oct. 30, 2015

(65) Prior Publication Data

US 2016/0157678 A1    Jun. 9, 2016

(30) Foreign Application Priority Data

Dec. 4, 2014    (CN) .................... 2014 2 0750778 U

(51) Int. Cl.
| | |
|---|---|
| *A47J 43/08* | (2006.01) |
| *B26D 1/29* | (2006.01) |
| *B26D 3/22* | (2006.01) |
| *A47J 43/07* | (2006.01) |
| *B26D 3/18* | (2006.01) |
| *B26D 7/06* | (2006.01) |
| *B26D 3/26* | (2006.01) |

(52) U.S. Cl.
CPC ......... *A47J 43/085* (2013.01); *A47J 43/0722* (2013.01); *B26D 1/29* (2013.01); *B26D 3/185* (2013.01); *B26D 3/22* (2013.01); *B26D 7/0608* (2013.01); *B26D 3/26* (2013.01)

(58) Field of Classification Search
CPC ... A47J 43/085; A47J 43/0717; A47J 43/0722
USPC .............................. 83/167; 99/537, 538, 545
See application file for complete search history.

(56) References Cited

U.S. PATENT DOCUMENTS

| | | | | |
|---|---|---|---|---|
| 3,664,396 | A | * | 5/1972 | Tremblay ................. B26D 3/18 241/101.01 |
| 3,799,023 | A | * | 3/1974 | Brignard ................. B02C 18/08 83/663 |
| 3,958,475 | A | * | 5/1976 | Zapomel ................. B26D 7/32 83/112 |
| 4,877,191 | A | * | 10/1989 | Golob ................... A47J 43/046 241/286 |

(Continued)

*Primary Examiner* — Jason Daniel Prone
*Assistant Examiner* — Richard Crosby, Jr.
(74) *Attorney, Agent, or Firm* — Davis, Malm & D'Agostine, P.C.

(57) ABSTRACT

A dicer is provided with a power output shaft in the container, and deceleration components and cutter disks on the output shaft. The cutter disks comprises a slicing cutter disk and a dicing cutter disk, a block in the container cover, a handle in the slicing cutter disk, and through-holes in the dicing cutter disk. The dicer is able to cut food into pieces with the same shape and size, and the dicing effectiveness is substantially perfect. The deceleration components have simple structure, which occupy small space and are convenient for household use. The handle is provided on the slicing cutter disk to facilitate detachment of the slice cutter disk for cleaning, and a through-hole is defined in the dicing cutter disk to facilitate detachment of the cutter disk for cleaning. The block makes the slicing cutter disk stable when rotating, to facilitate dicing.

6 Claims, 8 Drawing Sheets

(56) References Cited

U.S. PATENT DOCUMENTS

| | | | | |
|---|---|---|---|---|
| 5,513,810 A * | 5/1996 | Lin | B26D 3/225 | 241/168 |
| 6,035,771 A * | 3/2000 | Conran | A47J 43/082 | 241/199.12 |
| 6,520,822 B2 * | 2/2003 | Kennedy | A63H 33/28 | 446/15 |
| 7,059,553 B2 * | 6/2006 | Mueller | A47J 43/1025 | 241/168 |
| 7,669,793 B2 * | 3/2010 | So | A47J 43/044 | 241/169.1 |
| 7,681,495 B2 * | 3/2010 | Wan | A47J 43/1018 | 34/58 |
| 7,762,487 B2 * | 7/2010 | Cheung | A47J 43/1025 | 241/169.1 |
| 7,866,259 B2 * | 1/2011 | Zaghloul | A47J 37/1271 | 210/360.1 |
| 7,975,605 B2 * | 7/2011 | Wan | A47J 43/24 | 34/58 |
| 7,975,948 B2 * | 7/2011 | Holcomb | A47J 42/04 | 241/169.1 |
| 8,002,774 B2 * | 8/2011 | Burmeister, III | A61F 2/4644 | 241/92 |
| 8,402,886 B2 * | 3/2013 | Herren | A47J 43/105 | 241/101.1 |
| 8,677,895 B2 * | 3/2014 | Beber | A47J 43/0711 | 241/101.1 |
| 8,695,490 B2 * | 4/2014 | Harris | A47J 43/1031 | 74/125.5 |
| 8,708,262 B2 * | 4/2014 | Wong | A47J 43/1025 | 241/169.1 |
| 8,733,239 B2 * | 5/2014 | Allen | A47J 43/046 | 241/151 |
| 8,814,072 B2 * | 8/2014 | Gushwa | A47J 43/0716 | 241/36 |
| 8,943,954 B2 * | 2/2015 | Conti | A47J 43/0711 | 241/166 |
| 8,950,930 B2 * | 2/2015 | Wang | A47J 43/046 | 366/205 |
| 9,049,965 B2 * | 6/2015 | Beber | A47J 43/0716 | |
| 9,132,299 B2 * | 9/2015 | Sutton | A62B 18/02 | |
| 9,204,758 B2 * | 12/2015 | Wong | A47J 43/082 | |
| 9,254,064 B2 * | 2/2016 | Unteregger | B26D 1/28 | |
| 2005/0269434 A1 * | 12/2005 | Starr | A47J 43/0727 | 241/92 |
| 2007/0006739 A1 * | 1/2007 | Fevre | A47J 43/085 | 99/348 |
| 2008/0163768 A1 * | 7/2008 | Glucksman | A47J 43/0722 | 99/537 |
| 2009/0183611 A1 * | 7/2009 | Khubani | B26D 3/283 | 83/13 |
| 2010/0154658 A1 * | 6/2010 | Conti | A47J 43/0711 | 99/537 |
| 2010/0224041 A1 * | 9/2010 | Melton | B26D 1/09 | 83/13 |
| 2011/0174169 A1 * | 7/2011 | Watanabe | A21B 7/005 | 99/489 |
| 2013/0092775 A1 * | 4/2013 | Wang | A47J 43/085 | 241/277 |
| 2013/0233141 A1 * | 9/2013 | Hunt | B26D 3/26 | 83/167 |
| 2014/0047964 A1 * | 2/2014 | Zhao | B26D 3/28 | 83/167 |
| 2015/0158195 A1 * | 6/2015 | Ferrari | B26D 1/143 | 83/100 |
| 2015/0216360 A1 * | 8/2015 | Hosner | A47J 43/0755 | 241/37.5 |
| 2016/0157678 A1 * | 6/2016 | Chung | B26D 1/29 | 83/167 |

* cited by examiner

DICER

CROSS-REFERENCE TO RELATED APPLICATIONS

The present application claims priority from Chinese Patent Application No. 201420750778.X filed Dec. 4, 2014, the disclosure of which is hereby incorporated herein by reference

TECHNICAL FIELD

The present invention relates to a household kitchen appliance, in particular to a dicing machine.

BACKGROUND

Existing household food processors have the functions as grinding, mixing, chopping etc. However, the ones cutting the fruit and vegetable food into square lumps are relatively rare, and existing household food processors takes much manual labor. Later dicers appear on the market, which can realize the function of cutting the food into square lumps, but often need to reduce the output power of motor. Generally, a deceleration component is provided within the frame of the dicer. Such a dicer has complex structure, and large weight body, and which is not convenient to use, and has high cost.

In addition, when the rotating cutter disks of the dicer are assembled too tightly, the cutter disks and the limit members will produce large friction, resulting in delay in rotation of the cutting disks, stressed members' fracture and short service life; when the cutter disks are assembled too loose, the cutter disks will shake heavily, producing bad noise, and influencing the dicing effect.

SUMMARY OF THE INVENTION

In order to solve the above problems, the invention provides a dicer which can solve the technical problems of the existing food processors such as complex structure, inconvenient use and undesired dicing.

The technical problems are solved through the following technical solutions. A dicer includes a body, the body having a motor and deceleration components, and a container for containing dicing food, a container cover covering the container, and a power output shaft being provided in the container. The deceleration components and cutter disks are provided on the output shaft.

The cutter disk includes a slicing cutter disk and a dicing cutter disk, the dicing cutter disk being provided under the slicing cutter disk. A slicing cutter is provided on the slicing cutter disk, and a dicing grid cutter (54) is provided on the dicing cutter disk, the dicing cutter disk being fixed.

The deceleration components include a central gear on the output shaft, a deceleration box being provided on the central gear, and an annular gear being provided on the deceleration box.

The deceleration box includes a box and a bottom cover, the box and the bottom cover defining a cavity with cavity gears therein. The cavity gears are composed of 1~6 medium gears, each of medium gears having a gear needle at axis location, convex blocks being formed on a top surface of the bottom cover, needle holes being defined in the convex blocks for fitting to the gear needles, The gear needles, the convex block, the needle holes and the medium gears are the same in quantity.

Preferably, through-holes are defined in the box to facilitate the medium gears to extend out. The number of the through-holes matches the number of the medium gears, the gear group meshing with the central gear and the annular gear respectively.

The deceleration box is mounted on the slicing cutter disk or the dicing cutter disk.

Preferably, a shaft pin is provided on a top of the power output shaft, and a bearing is provided on the container cover to fix the shaft pin.

Preferably, a groove is defined in an inner edge of the container cover, a block being provided in the groove, the block having one end in contact with an inner wall of the container cover, and the other end pressing an edge of the slicing cutter disk.

Preferably, a handle is provided on the slicing cutter disk for facilitating to detach the slicing cutter disk, and a through-hole is defined in the dicing cutter disk for facilitating to detach the dicing cutter disk.

Preferably, a feeding tube is extended on the container cover. The feeding tube matches with a push rod. The container cover and the feeding tube are formed integrally, the grid cutter being exactly under the feeding tube directly.

The invention discloses a dicer which is able to cut food into pieces with the same shape and size, and the dicing effectiveness is perfect. The deceleration components are provided in the container and have simple structure, which occupy small space and are convenient for household use. The handle is provided on the slicing cutter disk for facilitating to detach the slice cutter disk for cleaning, and a through-hole is defined in the dicing cutter disk for facilitating to detach the dicing cutter disk for cleaning, which are easy to use and easy to clean. The block makes the slicing cutter disk not shake too much when rotating, thereby having good effect of dicing.

DETAILED DESCRIPTION OF THE INVENTION

Figure 1:
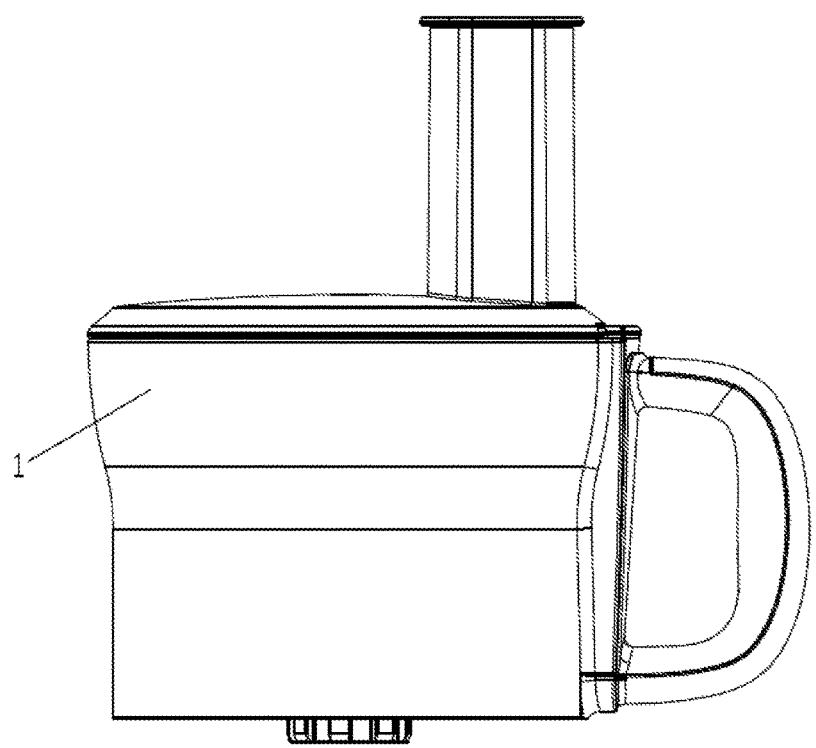
FIG. 1 is an overall structural view of the dicer.
Figure 2:
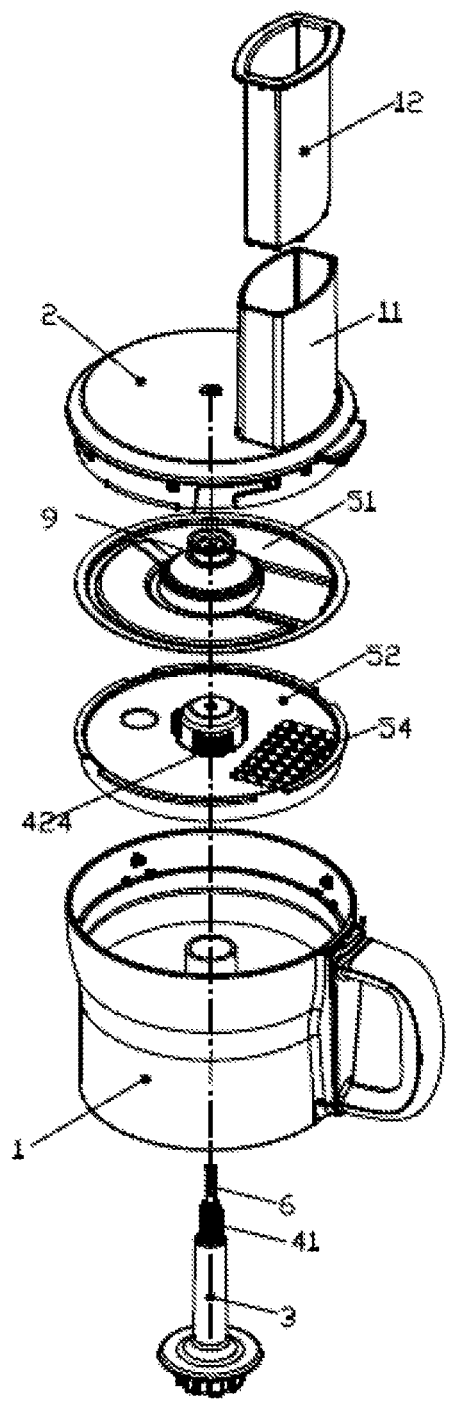
FIG. 2 is an exploded view 1 of the present invention's embodiment
Figure 3:
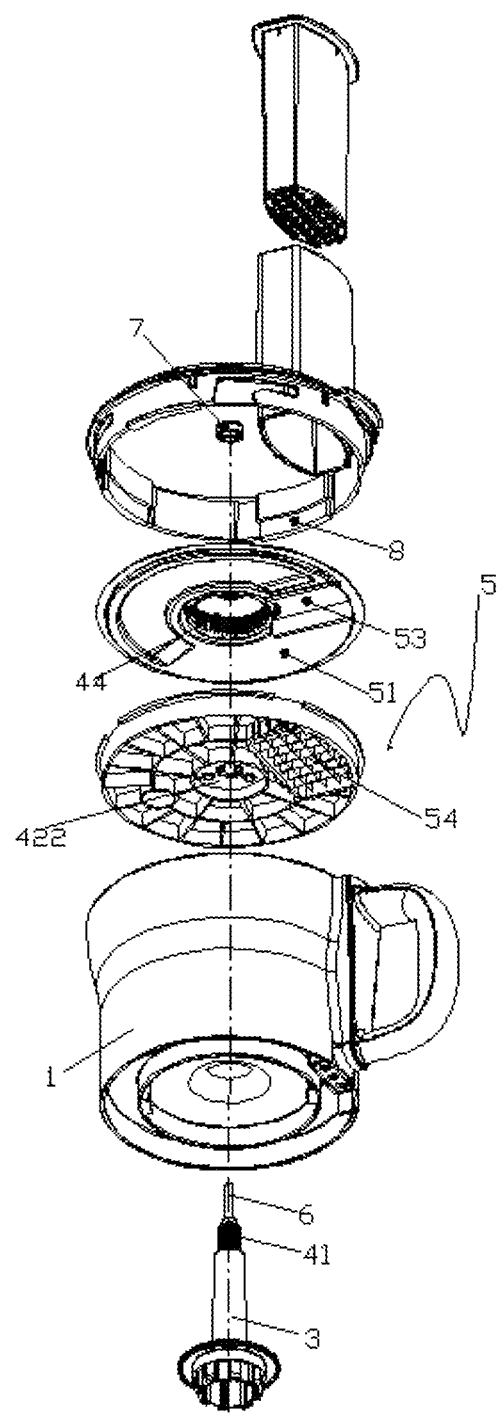
FIG. 3 is an exploded view 2 of the present invention's embodiment
Figure 4:
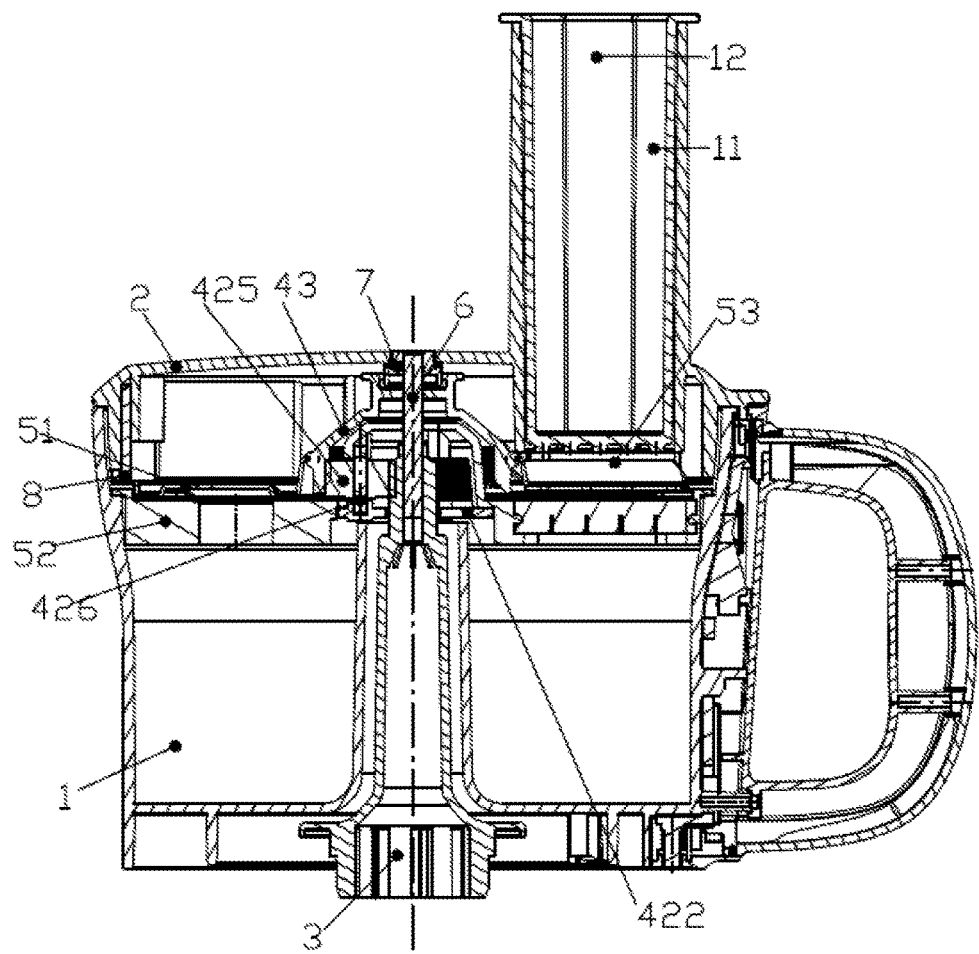
FIG. 4 is an exemplary cross-sectional view of the present invention's embodiment 1.
Figure 5:
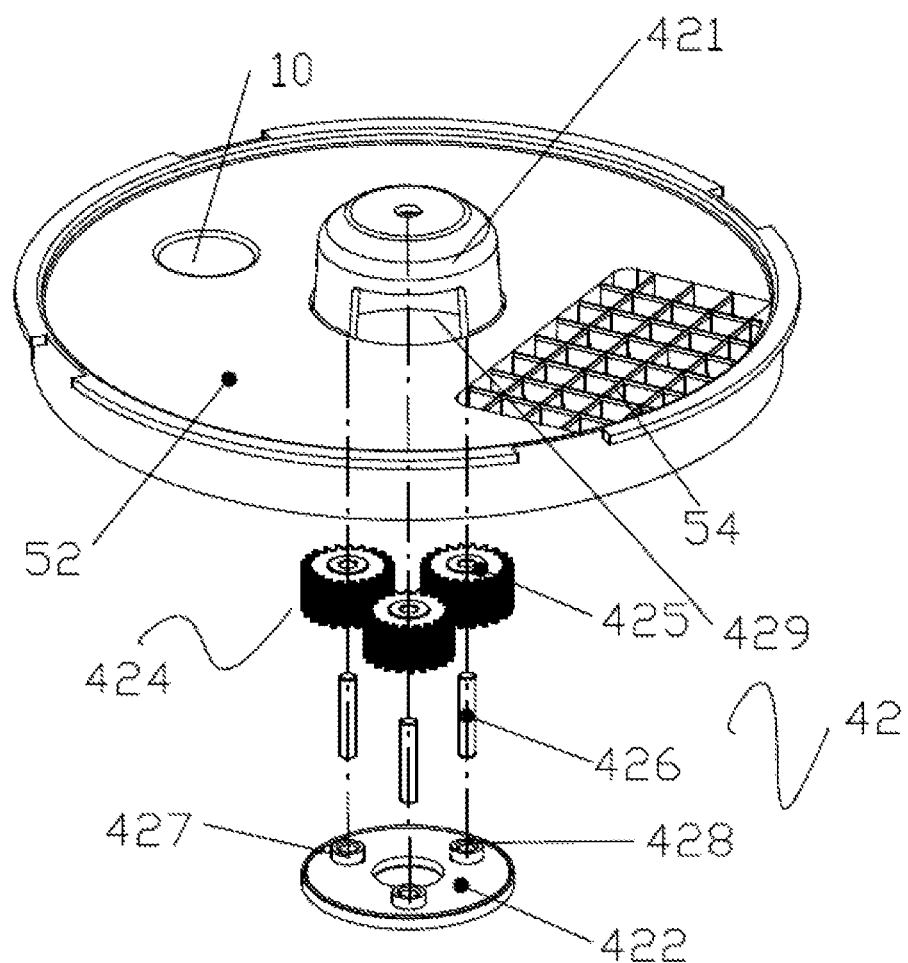
FIG. 5 is the dicing cutter disk's structural view of the present invention's embodiment 1.
Figure 6:
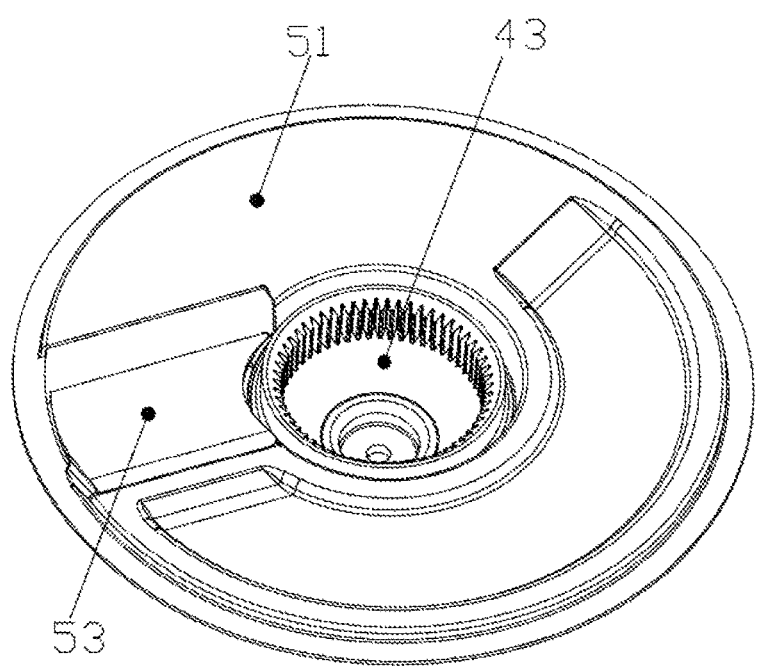
FIG. 6 is the slicing cutter disk's structural view 2 of the present invention's embodiment 1.

As shown in FIG. 1-8, a dicer includes a body which has a motor, a container 1 for containing food, a container cover 2 on the container. A feeding tube 11 extends on the container cover 2, and a push rod 12 is provided in and matches with the feeding tube 11. The push rod 12 can move up and down in feeding tube 11. The container cover and the feeding tube are formed integrally. A power output shaft 3 is provided in the container 1, and deceleration components and cutter disks 5 are provided on the output shaft.

The cutter disks comprise a slicing cutter disk 51 and a dicing cutter disk 52. The slicing cutter disk 51 sets a slicing cutter 53, while the dicing cutter disk 52 has a dicing grid cutter 54. The grid cutter is exactly under the feeding tube. The dicing cutter disk is fixed, and the slicing cutter disk's movement is affected by the deceleration components. A groove is defined in an inner edge of the container cover 2. A block 8 is provided in the groove. One end of the block is in contact with an inner wall of the container cover, and the other end of the block presses an edge of the slicing cutter disk. The block 8 can not only prevent the slicing cutter disk from moving dramatically, but also prevent the slicing cutter disk from moving upward when working. The power output shaft 3 sets a shaft pin 6 on a top thereof, and the container cover has a bearing 7 to fix the shaft pin. The shaft pin extends through the through hole of a bottom of the container, and is fixed by the bearing of the container cover. In order to facilitate to detach the cutter disks to clean, the slicing cutter disk 51 sets a handle 9 for facilitating to detach the slicing cutter disk, while the dicing cutter disk 52 sets a through-hole 10 for facilitating to detach the dicing cutter disk. The through-hole 10 can let at least one finger extend therethrough.

The dicing cutter disk is fixed. When the slicing cutter disk rotates with a low speed, the slicing cutter on the slicing cutter disk rotates with the slicing cutter disk together. The deceleration components are provided for reducing the motor power output.

In the embodiment 1, the deceleration box is provided on the dicing cutter disk. The deceleration components include a central gear 41 on the output shaft, a deceleration box 42, a gear frame 43 and an annular gear 44. The deceleration box 42 includes a box 421 and a bottom cover 422, the box and the bottom cover forming a cavity. Cavity gears 424 are provided in the cavity, and are composed of 1~6 medium gears 425. Each of the medium gears has a gear needle (426) at axis location. Convex blocks (427) are formed on a top surface of the bottom cover (422), and define needle holes (428) for fitting to the gear needles. The gear needles, the convex blocks, the needle holes and the medium gears are the same in quantity. The box 421 defines through holes 429 to facilitate the medium gears to extend out. The number of the through holes is the same as that of the medium gears. The gear group meshes with the central gear and the annular gear respectively. The gear frame 43 is set in center of the slicing cutter disk 51, and the annular gear 44 is on the bottom surface of the gear frame for cooperating with the gear group 424 to rotate.

The dicer works as follows. When working, the central gear of the output shaft drives the gear group in the deceleration box to rotate, and the gear group drives the gear frame to rotate. The dicing cutter disk is fixed, the slicing cutter disk rotates. Food entering from the feeding tube, will be cut by the slicing cutter and then be diced by the grid cutter, finally the container collects the diced food. The output shaft and the slicing cutter disk rotate in opposite directions. The deceleration box is on the dicing cutter disk, the output shaft rotates forward, and the central gear on the output shaft rotates forward, driving the gear group in the deceleration box of the dicing cutter disk to rotate forward. The dicing cutter disk is fixed, the annular gear of the slice cutter disk rotates in reverse direction with the gear group, and the slicing cutter disk also reversely rotates.

Figure 7:
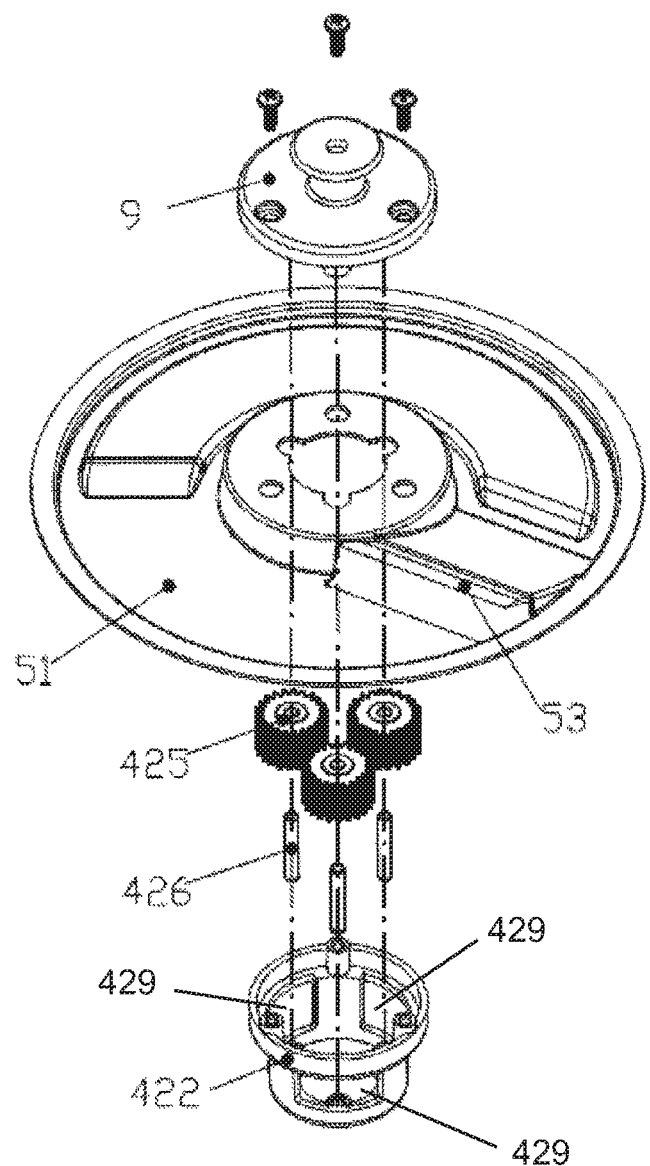
FIG. 7 is the slicing cutter disk's structural view of the present invention's embodiment 2.
Figure 8:
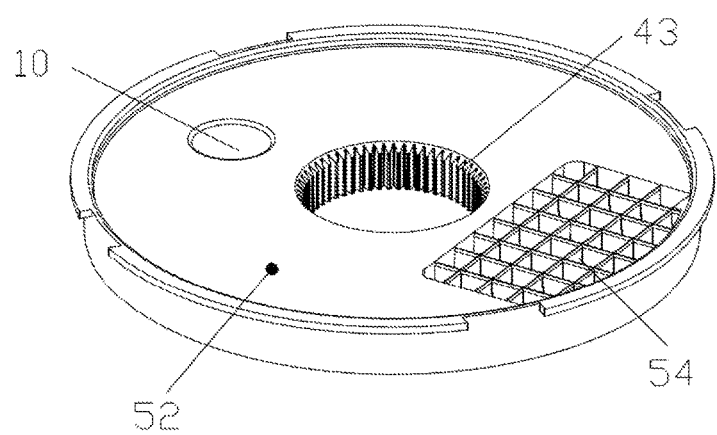
FIG. 8 is the dicing cutter disk's structural view 2 of the present invention's embodiment 2.

In the embodiment 2, as shown in the FIGS. 7 and 8, the dicer disclosed by this embodiment is similar in structure to that in embodiment 1. The difference is that the deceleration box is set on the slicing cutter disk instead of on the dicing cutter disk; and the annular gear is set on the dicing cutter disk, rather than the slicing cutter disk. The dicing cutter is fixed, so the central gear drives the gear group of the deceleration box to rotate, and the gear group cooperates with the fixed annular gear to rotate. Thus the slicing cutter disk is driven to rotate, and the output shaft rotates at the same direction as the slicing cutter disk. When the deceleration box is on the slicing cutter disk, the output shaft rotates forward, the central gear on the output shaft also rotates forward. As the dicing cutter disk is fixed, the annular gear on the dicing cutter disk is also fixed. The gear group in the deceleration box of the slicing cutter disk is driven to rotate forward, and the gear group rotates forward with the annular gear, so the slicing cutter disk rotates forward as well.

The preferable embodiments of the invention are shown in above. It is needed to be noted that, under the condition that not deviating from the spirit and substance of the present invention, a person skilled in the art is able to make various corresponding changes and modifications according to the present invention, but these respective changes and modifications also should be included in the protecting scope of the present invention.

What is claimed:

1. A motor-driven dicer including a body, a container for containing dicing food, and a container cover on the container for covering the container, which is characterized in that a power output shaft is provided in the container, and deceleration components and cutter disks are provided on the output shaft;

wherein the cutter disks include a slicing cutter disk and a dicing cutter disk, the dicing cutter disk being provided under the slicing cutter disk, a slicing cutter being provided on the slicing cutter disk, a dicing grid cutter being provided on the dicing cutter disk, the dicing cutter disk being fixed;

wherein the deceleration components include a central gear on the output shaft, a deceleration box being provided on the central gear, and a annular gear being provided on the deceleration box;

wherein the deceleration box includes a box and a button cover, the box and the bottom cover forming a cavity with cavity gears therein, the cavity gears including 1~6 medium gears, each of the medium gears having a gear needle at axis location, convex blocks being formed on a top surface of the bottom cover, needle holes being defined in the convex blocks for fitting to the gear needles, and the gear needles, the convex blocks, the needle holes and the medium gears being the same in quantity; and wherein through-holes are defined in the box to facilitate the medium gears to extend out, the number of the through-holes being the same as the number of the medium gears, the gears group meshing with the central gear and the annular gear respectively.

2. The dicer of claim 1, wherein the deceleration box is mounted on the slicing cutter disk or the dicing cutter disk.

3. The dicer of claim 1, wherein a shaft pin is provided on a top of the power output shaft, and a bearing is provided on the container cover to fix the shaft pin.

4. The dicer of claim 3, wherein a groove is defined in an inner edge of the container cover, a block being provided in the groove, the block having one end in contact with an inner wall of the container cover, and the other end pressing an edge of the slicing cutter disk.

5. The dicer of claim 4, wherein a handle is provided on the slicing cutter disk for facilitating to detach the slicing cutter disk, and a through-hole is defined in the dicing cutter disk for facilitating to detach the dicing cutter disk.

6. The dicer of claim 5, wherein a feeding tube is extended on the container cover, and has a push rod matching therewith, the container cover and the feeding tube being formed integrally, the grid cutter being exactly under the feeding tube.

\* \* \* \* \*